United States Patent [19]

Bryant

[11] Patent Number: 5,196,455

[45] Date of Patent: Mar. 23, 1993

[54] SELF-LEVELING SEALANT COMPOSITION AND METHOD RELATING THERETO

[75] Inventor: Joy Bryant, Newport News, Va.

[73] Assignee: Tremco Incorporated, Cleveland, Ohio

[21] Appl. No.: 707,715

[22] Filed: May 30, 1991

[51] Int. Cl.$^5$ .............................................. C08G 18/14
[52] U.S. Cl. ...................................... 521/51; 521/110; 521/126; 521/127; 521/159; 524/730; 528/59
[58] Field of Search ................ 521/51, 110, 126, 127, 521/159; 524/730; 528/59

[56] References Cited

U.S. PATENT DOCUMENTS 5,004,794  4/1991  Emmerling et al. .................. 528/59

*Primary Examiner*—Maurice J. Welsh
*Attorney, Agent, or Firm*—David P. Dureska; Konrad H. Kaeding

[57] ABSTRACT

The present invention relates to a one-part, self-leveling urethane sealant composition for substantially horizontal surfaces, wherein the sealant will flow within a crack, joint or the like and quickly cure to provide an elastomeric seal having a smooth, substantially horizontal surface. The cured sealant provides a surface and volume cure time superior to many known systems, and once cured, provides an elastomeric seal having a superior void volume and void distribution than many known self-leveling sealant systems.

14 Claims, No Drawings

SELF-LEVELING SEALANT COMPOSITION AND METHOD RELATING THERETO

FIELD OF THE INVENTION

The present invention relates to a one-part, self-leveling urethane sealant composition for substantially horizontal surfaces, wherein the sealant will flow within a crack, joint or the like and quickly cure to provide an elastomeric seal having a smooth, substantially horizontal surface. More specifically, the one-part, self-leveling sealant of the present invention preferably provides a surface and volume cure time superior to many known systems, and once cured, provides an elastomeric seal having less void volume (and generally a more advantageous void volume distribution) than many known self-leveling sealant systems.

BACKGROUND OF THE INVENTION

Traditional thixotropic sealants are not preferred for applying to horizontal surfaces, because the sealant will generally not form a smooth, uniform surface as it is squeezed out of the caulking tube, and customers typically prefer such smooth, uniform surfaces. Prior to curing, the surface can perhaps be smoothed over with a tool (or a finger), but this is messy, inconvenient, time-consuming, and still may not provide the desired surface appearance. Self-leveling sealants generally have a lower viscosity and therefore flow or "level out" to provide a substantially uniform and smooth, horizontal surface.

Although flow is initially desirable, consumers also want a quickly cured product, once the smooth surface is obtained. To obtain low initial viscosity which quickly increases, the art has generally used high loadings of urethane prepolymer.

In many conventional systems, the urethane prepolymer comprises free isocyanate which generally cures by reacting with ambient humidity. Such a curing reaction however generally produces carbon dioxide as a by-product. Oftentimes, the sealant surface will cure relatively quickly and trap the carbon dioxide within the sealant. In many conventional systems the carbon dioxide will concentrate toward the surfaces of the sealant and provide a substantial void cavity or cavities just under the surface of the sealant. This is often called "gassing" and is generally detrimental to the sealant's appearance and performance.

This carbon dioxide problem can be diminished by using a blocked amine curative. Such a curative will generally unblock in the presence of ambient humidity and react with the isocyanate in a reaction which does not produce an off gas. However, blocked amine curing systems are rather slow, and therefore the sealant will remain tacky longer than most consumers would like.

An alternative solution to the gassing problem is to use a two-part system, wherein the two components are mixed just prior to application. A quick cure time can thereby be achieved, but two-part systems are inconvenient, complex to use and prone to error during the mixing step. Consumers prefer one-part sealant systems.

A need therefore exists for a one-part, self-leveling formulation which has sufficient initial flow properties to provide a smooth surface, while thereafter quickly curing, but without forming concentrated voids toward the top of the cured product.

OBJECTS OF THE INVENTION

It is an object of the present invention to provide a self-leveling, one-part sealant product which has excellent initial flow characteristics but which thereafter quickly cures to provide a product substantially devoid of carbon dioxide "gassing" problems prevalent in the industry.

Other objects and features of the present invention will become apparent to those of ordinary skill in the art upon further reading of this specification and accompanying claims.

SUMMARY OF THE INVENTION

The one-part, self-leveling sealant of the present invention preferably comprises free isocyanate, urethane prepolymer having a weight average molecular weight in the range of about 400 to about 20,000, more preferably in the range of about 2,000 to about 10,000, and most preferably in the range of about 6,000 to about 8,000. The weight percentage of prepolymer comprising free isocyanate is preferably from about 0.7% to about 1.5%, more preferably from about 0.9% to about 1.2%, and most preferably from about 1.0% to about 1.1%. The weight percentage of prepolymer in the formulation is preferably in the range of about 25% to about 60%, more preferably from about 30% to about 50%, and most preferably about 40%.

Useful catalysts for the sealant of the present invention include the following: organo-polyvalent metal compounds, tertiary amines, and the like. Organo-polyvalent metal compounds are most preferred, such as bismuth, antimony and tin organo-compounds, most particularly tin organo-compounds such as, tin diacetate, tin dilaurate, tin octoate, dibutyltin dilaurate, phenylmercuric acetate, di(phenylmercury)dodecenyl succinate, and the like. The most preferred catalysts are tin diacetate and tin dilaurate.

For any particular embodiment of the present invention, the catalyst should provide sufficiently fast cure to provide a skin over time in less than about 60 minutes, but sufficiently slow to allow outgassing during about the first 30 minutes or so. The catalyst must be stable and not contribute to any unwanted side reactions, particularly during manufacture, transportation or storage of the sealant material.

Depending upon the particular embodiment of the present invention, upon exposure to ambient conditions, it is typically critical that the catalyst be selected, so the sealant does not skin-over before about 30 minutes, but does skin-over by about 60 minutes. The weight ratio of catalyst to prepolymer in the sealant is preferably in the range of about 0.05:1000 to about 1:1000, and more preferably in the range of about 0.1:1000 to about 0.5:1000.

The sealants of the present invention preferably have a skin time (at 77° F./50% RH) of less than about 60 minutes and greater than about 30 minutes, more preferably less than about 50 minutes and greater than about 40 minutes.

The preferred embodiment preferably also comprises a moisture scavenger. The moisture scavenger preferably reacts with moisture without giving off a hydroxyl species, amine species or any reactive by-product which might interfere with the curing reaction discussed above. In the preferred embodiment, the moisture scavenger reaction should not significantly change the pH of the sealant, since pH effects the cure rate and may influence side reactions. The preferred moisture scavengers are isocyanates, most preferably para-tolysulphonyl isocyanate ("PTSI") or the like.

The amount of water scavenger should be stoichiometric with the amount of water present in the sealant raw materials. Consequently, the amount of unwanted moisture within the sealant ingredients should be determined, and the amount of water scavenger should be adjusted accordingly. If too little water scavenger is present, unwanted curing of the prepolymer will occur during storage; if too much water scavenger is present, the excess isocyanate will slow down the cure time and may cause gassing problems.

The preferred embodiment also preferably comprises an adhesion promoter. The adhesion promoter should promote adhesion without unduly effecting the rheology, stability and curing reaction of the sealant material. The most preferred adhesion promoter is an epoxy silane.

The preferred embodiment also preferably comprises one or more rheological additives. The viscosity of the sealant should be sufficiently low to flow and level within a crack or crevice, but not so low as to be intolerant of a small (1% or 2% grade), since most seemingly horizontal surfaces are not precisely horizontal. The sealant should also have sufficient viscosity to resist movement along the wall of the crack or crevice as the sealant cures, thereby enhancing the sealing ability of the sealant.

The rheology of the sealant can be modified or controlled by adding viscosity modifiers, such as talc; solvents, such as toluene; plasticizers; various commercially available proprietary additives; and the like.

The preferred embodiment also preferably comprises ultra violet light stabilizers, such as pigments, formamaline derivatives, benzotriazole, commercially available proprietary UV stabilizers, and the like.

Additives such as paraffinic oil can also be added to enhance tack-free properties during cure. Other additives can be used, depending upon the end use of the material. For any particular embodiment of the present invention, ordinary skill and experimentation may be necessary, after reading this specification and accompanying claims, before adopting any particular formulation, depending upon the performance requirements obtained.

An important feature of the present invention is the attainment of a cured product having substantially uniformly distributed cavities much as a sponge, rather than a cavity concentration at the surface of the material.

Critical to the manufacturing process of the preferred embodiment is that the adhesion promoter (epoxy silane) and catalyst (tin diacetate or tin dilaurate) be added in separate steps, so that the adhesion promoter does not inactivate the catalyst prior to final formulation.

DESCRIPTION OF THE PREFERRED EMBODIMENTS

The one-part, self-leveling sealant of the present invention preferably comprises free isocyanate, urethane prepolymer having a weight average molecular weight in the range of about 400 to about 20,000, more preferably in the range of about 2,000 to about 10,000, and most preferably in the range of about 6,000 to about 8,000. In solvent-free systems, the prepolymers generally should be in the lower portion of the above ranges, and where a solvent is employed, generally higher molecular weight prepolymers can be tolerated. However, any solvent employed should be inert with respect to the prepolymer and volatile under the curing conditions.

The weight percentage of prepolymer comprising free isocyanate is preferably from about 0.7% to about 1.5%, more preferably from about 0.9% to about 1.2%, and most preferably from about 1.0% to about 1.1%. The weight percentage of prepolymer in the formulation is preferably in the range of about 25% to about 60%, more preferably from about 30% to about 50%, and most preferably about 40%.

Isocyanate terminated polyurethane prepolymers useful in the present invention are preferably prepared by reacting a molar excess of organic polyisocyanate with one or more polyols as is well known in the art. A summary of urethane polymer chemistry and technology can be found in Polyurethanes: Chemistry and Technology, Saunders and Frisch, Interscience Publishers (New York, 1963 (Part I) and 1964 (Part II).

Any suitable organic polyisocyanate, either aliphatic, cycloaliphatic, araliphatic or aromatic, may be used. Suitable organic polyisocyanates include meta-phenylene diisocyanate, paraphenylene diisocyanate, 4,4'-diphenylmethane diisocyanate, benzidine diisocyanate, naphthalene-1,5-diisocyanate, hexamethylene diisocyanate, 4,4'4"-triphenylmethane triisocyanate, decamethylene diisocyanate, poly phenylmethylene polyisocyanates that are produced by phosgenation of aniline/formaldehyde condensation products, dianisidine diisocyanate, xylylene diisocyanate, bis(2-isocyanatoethyl)fumarate, bis(2-isocyanatoethyl)cyclohex-4-ene-1,2-dicarboxylate, bis(2-isocyanatoethyl)carbonate, and many other organic polyisocyanates known in the art.

In producing the isocyanate terminated polyurethane prepolymers of the present invention, one or more polyhydroxy compounds or polyols can be employed in the reaction with the organic polyisocyanate.

Illustrative polyhydroxy compounds include the following classes of compounds:

(a) lactone polyols and the alkylene oxide adducts thereof;
(b) the polyester polyols, and the alkylene oxide adducts thereof;
(c) the polyoxyalkylene polyols and polyoxycycloalkylene polyols, and the alkylene oxide adducts thereof;
(d) the non-reducing sugars and sugar derivatives and the alkylene oxide adducts thereof;
(e) the alkylene oxide adducts of polyphenols;
(f) the polytetramethylene glycols;
(g) the functional glycerides, such as castor oil;
(h) polyhydroxy polysulfide polymers;
(i) hydroxyl terminated extended lactone polyesters prepared by phosgenating a lactone polyester with a polyol such as bisphenol A, and the like.

The term "alkylene oxide" includes, for example, ethylene oxide, 1,2-epoxypropane, 1,2-epoxybutane, 2,3-epoxybutane, isobutylene oxide, epichlorohydrin, and the like and mixtures thereof.

Lactone polyols are prepared by reacting a lactone such as epsilon-caprolactone or a mixture of epsilon-caprolactone and an alkylene oxide with a polyfunctional initiator such as polyhydric alcohol. The term "lactone polyols" also includes the various "copolymers" such as lactone copolyesters, lactone polyester/polycarbonates, lactone polyester/polyethers, lactone polyester/polyether/polycarbonates, and the like. Useful lactone polyols, their preparation and properties are more fully described in U.S. Pat. Nos. 2,878,236, 2,890,208, 2,933,477, 2,933,478 and 3,169,945.

Polyester polyols are esterification products which range from liquids to non-crosslinked solids, i.e., solids which are insoluble in many of the more common inert normally liquid organic media, and which are prepared by the reaction of monocarboxylic acids and/or polycarboxylic acids, their anhydrides, their esters, or their halides, with a stoichiometric excess of a polyol, such as pentaerythritol.

Illustrative of the polycarboxylic acids which can be employed to prepare the polyester polyols preferably included dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butanetricarboxylic acid, phthalic acid, and the like, while the esterification reaction is well known in the art.

The polyol or polyol mixture employed can have hydroxyl numbers which vary over a wide range. In general, the hydroxyl numbers of the polyols employed in the invention can range from about 20 to about 1000, preferably, from about 25 to about 50, and more preferably from about 25 to about 30. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH\# = (56,105 \times f)/M.W.$$

where
OH# = hydroxy number of the polyol
f = average functionality, this is average number of hydroxyl groups per molecule of polyol
M.W. = average molecular weight of the polyol.

The most preferred polyisocyanate is 4,4'-diphenylmethane diisocyanate ("MDI"), while the most preferred polyols are the diols and triols of polyalkylene glycols.

As pointed out above to prepare the isocyanate terminated polyurethane prepolymers useful in this invention, at least a slight mole excess of —NCO equivalents (groups) with respect to the hydroxyl equivalents (groups) is employed. Of course, it should be understood that as well as employing a single type of polyisocyanate compound and a single type of polyol compound mixtures of various isocyanates as well as mixtures of various polyols may be used if desired.

Background information on polyols which can be used for the polyurethane prepolymers of this invention is contained in U.S. Pat. No. 3,632,557, Column 2, line 56 to Column 4, line 19 inclusive.

Suitable isocyanates that can be used for preparing the polyurethane polymers of this invention are contained in U.S. Pat. No. 3,632,557, Column 2, lines 41 to 59; U.S. Pat. No. 3,627,722, Column 2, line 71 to Column 3, line 11 inclusive; and U.S. Pat. No. 3,711,445, Column 2, lines 3–60 inclusive.

Suitable catalysts for the preparation of the polyurethane prepolymers of this invention are presented in U.S. Pat. No. 4,067,844, Column 3, lines 25 to 36 inclusive.

The preferred catalyst for the sealant of the present invention include organo-polyvalent metal compounds, tertiary amines, and the like. Organo-polyvalent metal compounds are most preferred, such as bismuth, antimony and tin organo-compounds, most particularly tin organo-compounds such as, tin diacetate, tin dilaurate, tin octoate, dibutyltin dilaurate, phenylmercuric acetate, di(phenylmercury)dodecenyl succinate, and the like. The most preferred catalysts are tin diacetate and tin dilaurate.

For any particular embodiment of the present invention, the catalyst should provide a cure sufficiently fast to be convenient for the user, but sufficiently slow to substantially allow out-gassing during about the first 30 minutes. The catalyst must be stable and not contribute to any unwanted side reactions, particularly during manufacture, transportation or storage of the sealant material.

Depending upon the particular embodiment of the present invention, it is typically critical that the catalyst be selected such that the sealant does not skin-over before about 30 minutes after exposure to ambient conditions, but does skin-over by about 60 minutes after exposure to ambient conditions. The weight ratio of catalyst to prepolymer in the sealant is preferably in the range of about 0.05:1000 to about 1:1000, and more preferably in the range of about 0.1:1000 to about 0.5:1000.

The preferred sealants of the present invention preferably have a skin time (77° F./50% RH) of less than about 60 minutes and greater than about 30 minutes, more preferably less than about 50 minutes and greater than about 40 minutes.

The preferred embodiment preferably also comprises a moisture scavenger. The moisture scavenger preferably reacts with moisture without giving off a hydroxyl, amine or any reactive by-product which might interfere with the curing reaction discussed above. In the preferred embodiment, the moisture scavenger reaction should not even significantly change the pH of the sealant, since pH effects the cure rate and may influence side reactions. The preferred moisture scavengers are isocyanates, most preferably paratolysulphonyl isocyanate ("PTSI") or the like. The amount of water scavenger should be stoichiometric with the amount of water present in the sealant raw materials. The amount of unwanted moisture within the sealant ingredients should be determined, and the amount of water scavenger should be adjusted accordingly. If too little water scavenger is present, unwanted curing of the prepolymer will occur during storage; if too much water scavenger is present, the excess isocyanate will slow down the cure time, while also causing undue gassing.

The preferred embodiment also preferably comprises an adhesion promoter. The adhesion promoter should promote adhesion without unduly effecting the rheology, stability and curing reaction of the sealant material. The most preferred adhesion promoter is an epoxy silane.

The preferred embodiment also preferably comprises one or more rheological additives. The viscosity of the sealant should be sufficiently low to flow and level within a crack or crevice, but not so low as to be intolerant of a small (1% or 2% grade), since most seemingly horizontal surfaces are not precisely horizontal. The sealant should also have sufficient viscosity to resist movement along the wall of the crack or crevice as the sealant cures, thereby enhancing the sealing ability of the sealant.

The viscosity of the sealant can be increased by viscosity builders, such as vapor talc, various commercially available proprietary additives, and the like. Reinforcing fillers, such as fumed silicas, silica aerogels, precipitated silicas of high surface area, carbon black, and coated or uncoated calcium carbonate, can increase viscosity as well as enhance the structure of the cured polymer matrix. Nonreinforcing fillers can also be used, for example, coarse silicas, such as diatomaceous earth, crush quartz or metallic oxides, such as titania, ferric oxide, zinc oxide, talc and the like. In addition, fibrous fillers such as asbestos or glass fibers or filaments may be used. In all cases, it is desirable that the filler be substantially dry before admixed with the polymers. The fillers are generally employed to upgrade physical properties and to modify the flow characteristics of the uncured polymer. Additives to reduce viscosity include solvents, such as toluene, plasticizers and the like.

The preferred embodiment also preferably comprises ultra violet light stabilizers, such as pigments, formamadine derivatives, benzotriazole, commercially available proprietary UV stabilizers, and the like.

Additives such as paraffinic oil can also be added to enhance tack-free properties during cure. Other additives can be used, depending upon the end use of the material.

For any particular embodiment of the present invention, ordinary skill and experimentation may be necessary, after reading this specification and accompanying claims, before adopting any particular formulation, depending upon the performance requirements obtained.

An important feature of the present invention is the attainment of a cured product having substantially uniformly distributed cavities much as a sponge, rather than a cavity concentration at the surface of the material.

Critical to the manufacturing process of the preferred embodiment is that the adhesion promoter (epoxy silane) and catalyst (tin diacetate or tin dilaurate) be added in separate steps, so that the adhesion promoter does not inactivate the catalyst prior to final mixing.

The invention is further described in the Examples which follow. All parts and percentages are by weight unless otherwise specified.

EXAMPLES

Sample

In a conventional mixer using conventional mixing technique, the ingredients of Table 1 were added together and mixed in two steps. The first step involved all of the ingredients except for the catalyst. After thorough mixing of the first set of ingredients, the catalyst (dispersed in toluene) was added. The catalyst and adhesion promoter were added in separate steps to inhibit unwanted reaction between the adhesion promoter and catalyst.

TABLE 1

| PREFERRED SEALANT FORMULATION | |
|---|---|
| Ingredient | Amount |
| 1. MDI prepolymer[1] | 39.08 weight parts |
| 2. Moisture Scavenger[2] | 0.68 weight parts |
| 3. Adhesion Promoter[3] | 0.21 weight parts |
| 4. Catalyst[4] | 0.02 weight parts |
| 5. Fillers, Pigment, U.V. Stabilizers, and | 60.00 weight parts |

TABLE 1-continued

| PREFERRED SEALANT FORMULATION | |
|---|---|
| Ingredient | Amount |
| Rheological Modifiers | |

[1] Polypropylene oxide (ethylene oxide end-capped) triol of 6000 weight average molecular weight reacted with sufficient MDI monomer to obtain isocyanate functionality at each chain end
[2] Upjohn Additive TI
[3] Epoxy Silane - Union Carbide A189
[4] Dibutyltin Diacetate The final mixture was then tested against two conventionally known self-leveling sealants: 1. Mameco VULKEM 45; and 2. Sonneborne SL-1. The results are provided in Table 2.

TABLE 2

| Test | Example | VULKEM 45 | SL-1 |
|---|---|---|---|
| 1. Skin Time[1] | 45 | 900 | 210 |
| 2. Skin Time[2] | 390 | >5,000 | 1,320 |
| 3. Tack Free Time[1] | 90 | >1,400 | 450 |
| 4. Tack Free Time[2] | 360 | >5,000 | >24,000 |
| 5. Gassing[3] | minimal | minimal | severe |

[1] Minutes @ 77° F. and 50% relative humidity
[2] Minutes @ 40° F. and 50% relative humidity
[3] Sealant applied to a wet concrete block and placed under a U.V. lamp for 4 hours Although the invention has been described in its preferred forms with a certain degree of particularity, it will be understood by those skilled in the art that the present disclosure has been made only by way of example and that numerous changes can be made without departing from the spirit and the scope of the invention.

What is claimed is:

1. A one-part, self-leveling sealant comprising:
   a polyurethane prepolymer having a weight average molecular weight of from about 400 to about 20,000, wherein the weight percentage of isocyanate groups within the prepolymer is from about 0.9% to about 1.2% and the weight percentage of prepolymer in the sealant is from about 25% to about 60%; and
   an organo-polyvalent metal catalyst, wherein the weight ratio of said catalyst to said prepolymer in the sealant is from about 0.05:1000 to about 1:1000, whereby the sealant cures to a final product comprising substantially uniformly distributed internal cavities.

2. The sealant of claim 1 wherein the skin-over time of the sealant is greater than about 30 minutes but less than about 60 minutes after exposure to ambient conditions of 77° F. and 50% relative humidity.

3. The sealant of claim 1 wherein the urethane prepolymer is the reaction product of polyoxyalkylene polyol and an aromatic diisocyanate.

4. The sealant of claim 1 wherein the aromatic diisocyanate is 4,4'-biphenylmethane diisocyanate.

5. The sealant of claim 3 wherein the catalyst is an organo tin catalyst.

6. The sealant of claim 4 wherein the catalyst is dibutyl tin diacetate or dibutyl tin dilaurate.

7. The sealant of claim 1 further comprising an isocyanate moisture scavenger.

8. The sealant of claim 7 wherein the moisture scavenger is para-tolysulphonyl isocyanate ("PTSI").

9. The sealant of claim 7 further comprising an adhesion promoter.

10. The sealant of claim 9 wherein the adhesion promoter is an epoxy silane.

11. A method of sealing a substantially horizontal substrate, said method comprising the step of applying the sealant of claim 1 to said substrate and allowing it to flow, level and ultimately cure.

12. A method of manufacturing the sealant of claim 10 wherein the catalyst and adhesion promoter are not added together in a single step.

13. A one-part, self-leveling sealant comprising:
a polyurethane prepolymer having a weight average molecular weight of from about 400 to about 20,000, wherein the weight percentage of isocyanate groups within the prepolymer is from about 0.7% to about 1.5% and the weight percentage of prepolymer in the sealant is from about 25% to about 60%;
a moisture scavenger, said scavenger being para-tolysulphonyl isocyanate (PTSI); and
an organo-polyvalent metal catalyst, wherein the weight ratio of said catalyst to said prepolymer in the sealant is from about 0.05:1000 to about 1:1000, whereby the sealant cures to a final product comprising substantially uniformly distributed internal cavities.

14. A one-part, self-leveling sealant comprising:
a polyurethane prepolymer having a weight average molecular weight of from about 400 to about 20,000, wherein the weight percentage of isocyanate groups within the prepolymer is from about 0.7% to about 1.5% and the weight percentage of prepolymer in the sealant is from about 25% to about 60%;
a moisture scavenger;
an epoxy silane for promoting adhesion; and
an organo-polyvalent metal catalyst, wherein the weight ratio of said catalyst to said prepolymer in the sealant is from about 0.05:1000 to about 1:1000, whereby the sealant cures to a final product comprising substantially uniformly distributed internal cavities.

* * * * *